Jan. 21, 1964  J. S. BEATTIE  3,118,357
CAMERA
Filed Feb. 27, 1961  3 Sheets-Sheet 1
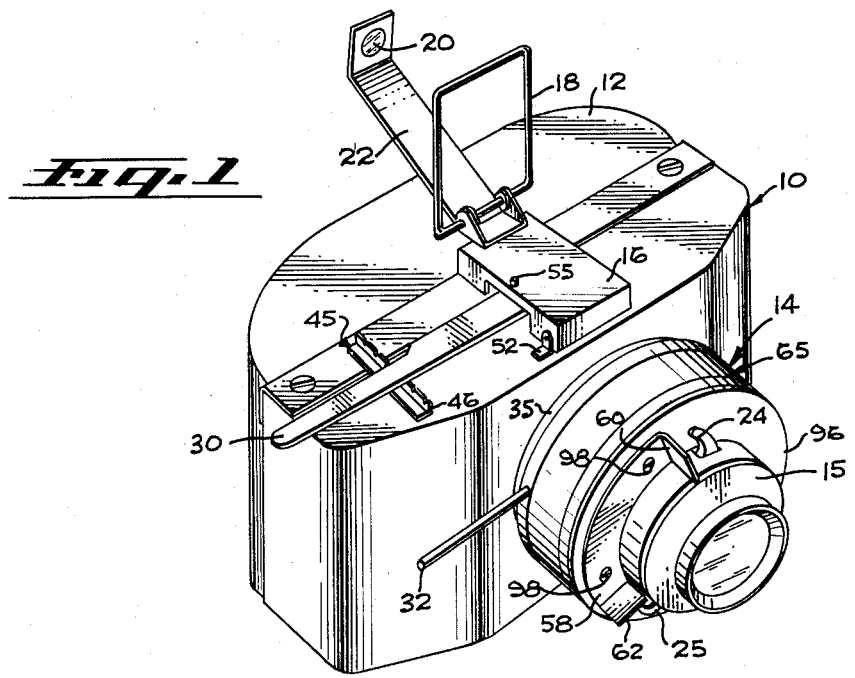
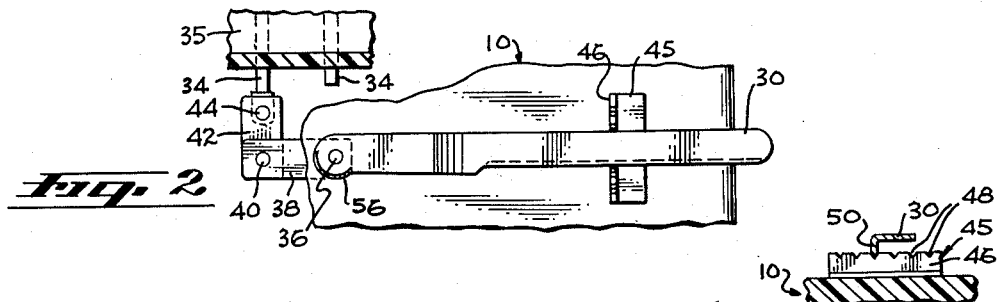
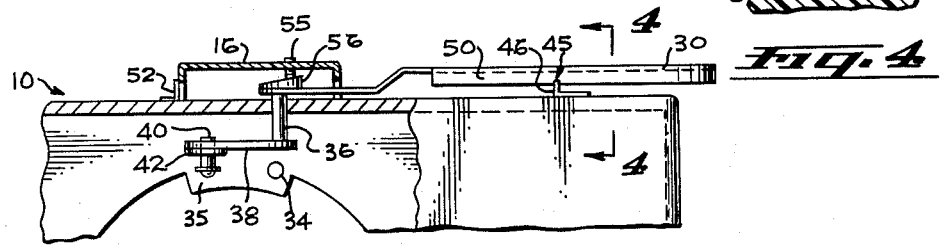
INVENTOR.
JAMES S. BEATTIE
BY
Jess M Roberts
ATTORNEY

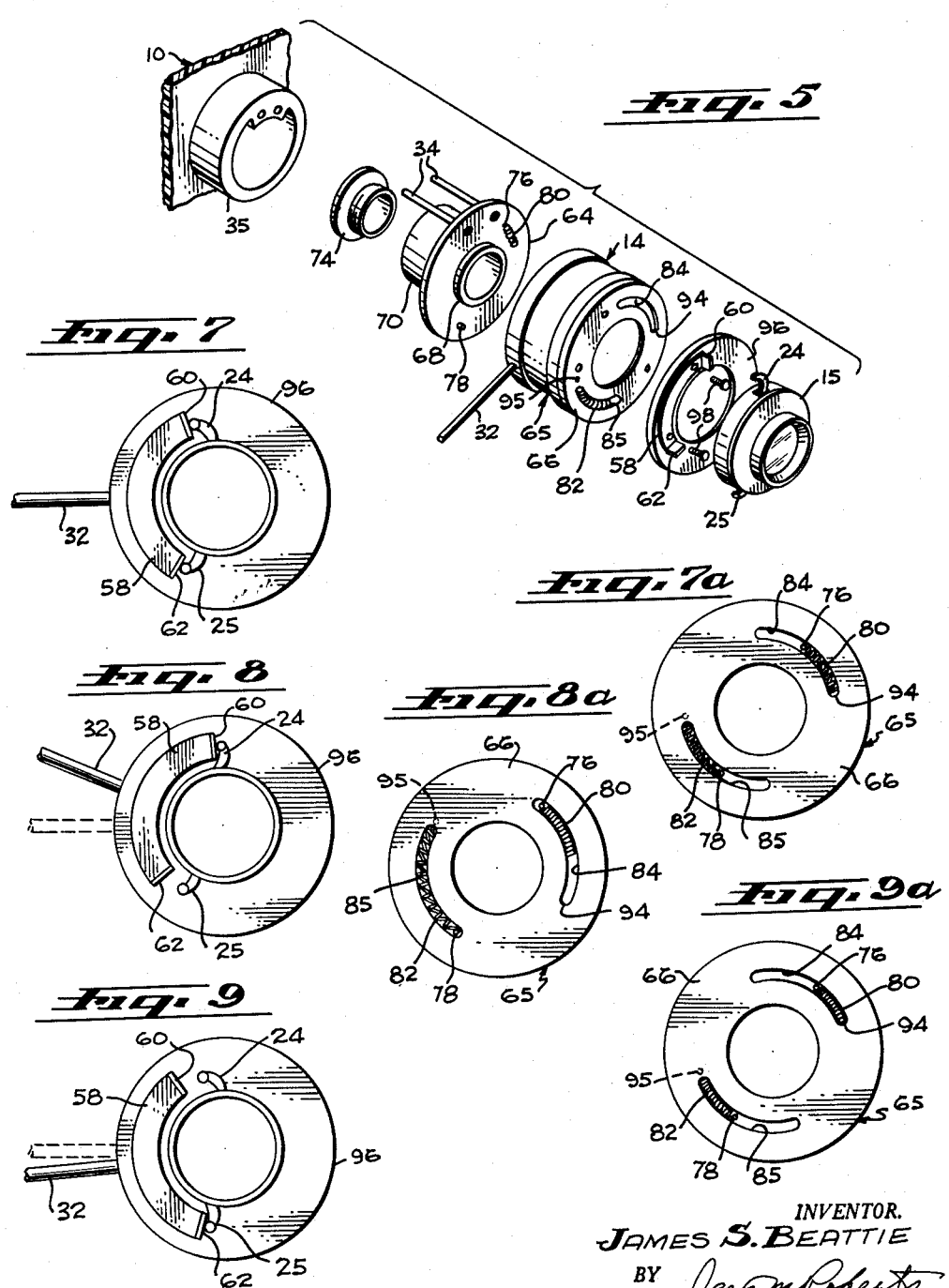

Jan. 21, 1964   J. S. BEATTIE   3,118,357
CAMERA
Filed Feb. 27, 1961   3 Sheets-Sheet 3
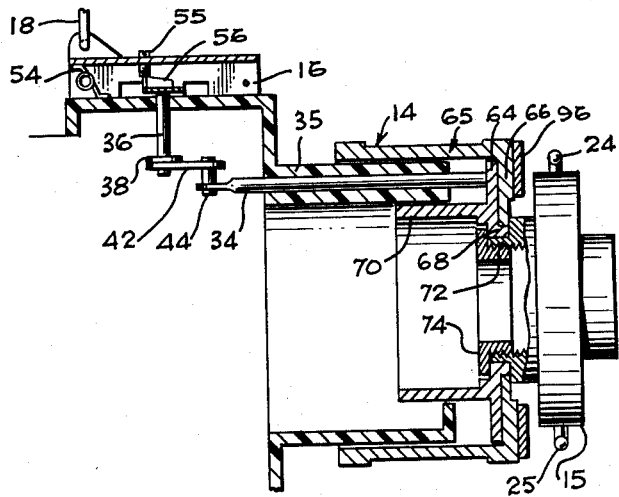
Fig. 6
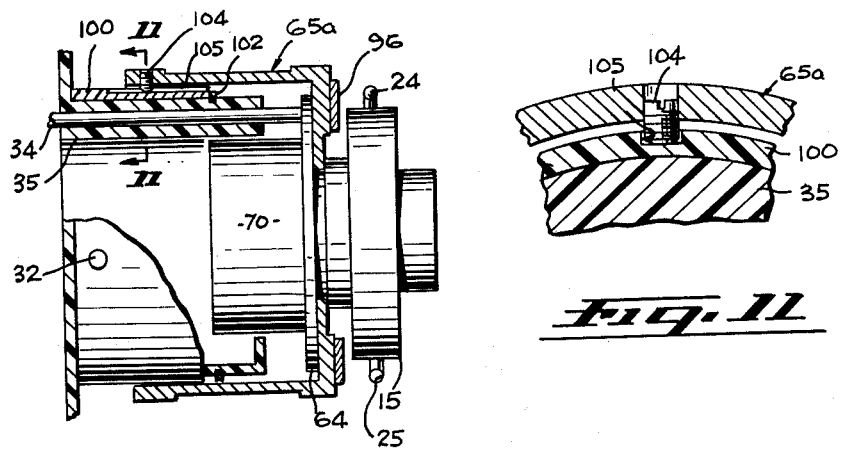
Fig. 10
Fig. 11
INVENTOR.
JAMES S. BEATTIE
BY
ATTORNEY United States Patent Office 3,118,357
Patented Jan. 21, 1964

3,118,357
CAMERA
James S. Beattie, Newport Beach, Calif., assignor to Beattie-Coleman, Inc., Anaheim, Calif., a corporation of California
Filed Feb. 27, 1961, Ser. No. 91,734
8 Claims. (Cl. 95—11)

This invention relates to a camera of the type that is hand held and is commonly used for press photography. The general purpose of the invention is to provide a compact camera which may be manipulated to take a picture with minimum loss of time and with maximum convenience for the photographer. In the photographing of news events and especially sports events, the opportunities for highly desirable shots are fleeting and the photographer must be alert and act fast. Too often there is only time enough to sight the camera and to take any additional time to shift a hand from the camera or to grope for camera controls is to lose a picture.

The present invention makes it possible for the photographer to grasp the opposite sides of a camera firmly in his two hands and to focus the camera and operate the shutter without relinquishing or even relaxing either grip. For this purpose both the focusing control and the shutter control extend laterally to the side of the camera for convenient finger manipulation. The two controls may extend to opposite sides of the camera but in the selected embodiment of the invention both controls extend to the right side of the camera for manipulation by the fingers of the right hand while the right hand grasps the camera.

The photographer may operate the focusing control either with the guidance of a range finder or with the guidance of a focusing scale on the camera. If the focusing scale is relied upon the photographer may memorize the different settings to make it possible to adjust the focusing lever without the necessity of directly observing the focusing scale. A feature of the invention in this respect is that the focusing lever is equipped with a detent means for selective engagement with notches in the focusing scale.

A special advantage of the selected embodiment of the invention is that adjustment of the focusing lever also adjusts the view finder to compensate for parallax. Thus the scene that is framed by the view finder always coincides with the image that is in focus on the film.

The shutter control lever extends laterally from the forward portion of the camera with the swinging end of the lever within easy reach of the fingers of the hand that grasps the corresponding side of the camera. An upward flip of the outer end of the shutter control lever cocks the lens shutter and subsequently depressing the outer end of the lever trips the shutter.

The invention is characterized by the simplicity of the two control arrangements. The focusing lever is connected to the extensible lens mount of the camera by a simple arm and link. The focusing lever is resilient so that its detent means may be disengaged from a notch in the focusing scale by merely flexing the lever. Parallax adjustment of the view finder is accomplished simply by extending the view finder over the focusing lever and providing the focusing lever with a cam element to tilt the view finder.

The shutter control lever is unitary with an actuating member that is positioned between the conventional cocking lever and the conventional tripping lever of a conventional lens mount. Upward movement of the shutter control lever moves the actuating member in one direction circumferentially of the lens mount to abut and actuate the cocking lever of the shutter mechanism. Downward movement of the shutter control lever moves the actuating member in the opposite direction circumferentially of the lens mount to abut and actuate the tripping lever of the shutter mechanism. In the absence of manual force the shutter control lever seeks an intermediate normal position.

A feature of the invention is the employment of opposed springs to urge the shutter control lever to its normal position, one spring acting in tension and the other spring acting in compression. The cocking movement of the shutter control lever is resisted by the tension spring which returns the shutter control lever to its normal position. The compression spring which is stronger than the tension spring serves as a shock absorber to decelerate the return of the shutter control lever to its normal position. The short swing of the shutter operating lever that trips the shutter is resisted by the compression spring.

The features and advantages of the invention may be understood from the following detailed description and the accompanying drawings.

In the drawings, which are to be regarded as merely illustrative:

FIG. 1 is a perspective view of a camera embodying the presently preferred practice of the invention;

FIG. 2 is a fragmentary view in plan of the camera with portions broken away to show how the focusing lever is connected to the extensible lens mount of the camera by means including a rocker arm and a cooperating link;

FIG. 3 is a fragmentary view partly in elevation and partly in vertical section showing the same rocker arm and link and also showing the cam element on the focusing lever for automatic parallax adjustment of the view finder;

FIG. 4 is a fragmentary section taken as indicated by the line 5—5 of FIG. 3 showing how the focusing lever is provided with a detent element for selectively engaging notches in the focusing scale on the camera;

FIG. 5 is an exploded view of the cooperating components that are associated with the shutter control lever;

FIG. 6 is a vertical longitudinal section through the forward portion of the camera;

FIG. 7 is a simplified front elevation of the lens mount showing the shutter control lever at its normal neutral position;

FIG. 7a is an elevational view of a portion of the mechanism associated with the shutter control lever, the view showing the positions of the tension spring and compression spring when the shutter control lever is in the normal position shown in FIG. 7;

FIG. 8 is a view similar to FIG. 7 showing the shutter control lever elevated to cause the arcuate actuating member to actuate the cocking lever of the shutter mechanism;

FIG. 8a is a view similar to FIG. 7a showing the positions of the tension spring and the compression springs when the shutter control lever is in the elevated position shown in FIG. 8;

FIG. 9 is a view similar to FIGS. 7 and 8 showing the shutter control lever depressed to cause the arcuate actuating member to operate the trip lever of the shutter mechanism;

FIG. 9a is a view similar to FIGS. 7a and 8a showing the positions of the two springs when the shutter control lever is in the depressed position shown in FIG. 9;

FIG. 10 is a sectional view like FIG. 6 showing a modification of the invention; and FIG. 11 is an enlarged fragmentary section taken as indicated by the line 11—11 of FIG. 10.

In the selected embodiment of the invention, the camera housing which is generally designated by numeral 10 has the usual removable rear section 12 which is a magazine for roll film that may be advanced frame-by-frame in the usual manner. The camera housing 10 further includes a forward extensible cylindrical section 14 which carries a lens mount 15 and which is telescopically mounted in a sliding manner to serve as a bellows for varying the distance between the lens mount and the film as required to focus images on the film. A view finder mounted on a base block 16 comprises a foldable rectangular viewing frame 18 and a viewing lens 20 on a foldable arm 22.

The lens mount 15 which incorporates the usual adjustable diaphragm (not shown) has the usual concealed shutter mechanism which may be cocked by clockwise movement of a cocking lever 24 and may be tripped by counterclockwise movement of a tripping lever 25. In a well-known manner the lens mount is further adapted for tripping the shutter electrically by a flash attachment.

All of the structure described to this point is conventional and old in the art.

The present invention adds a focusing lever 30 on the top side of the camera housing 10 and a shutter control lever 32 extending radially from the extensible cylindrical section 14 of the camera housing. It is contemplated that the camera will be held by two hands, one on each side of the camera and suitable handles (not shown) may be mounted on the opposite sides of the camera for this purpose. The two levers 30 and 32 both extend in the same lateral direction so that both may be manipulated by the fingers of one hand without the hand relinquishing or relaxing its grasp on the side of the camera.

The focusing lever 30 may be operatively connected in any suitable manner to the forward cylindrical section 14 for advancing and retracting the lens mount. In this particular embodiment of the invention the cylindrical housing section 14 is provided with a pair of parallel guide pins 34 which are slidingly mounted in corresponding bores in a fixed cylindrical wall 35 of the camera housing (FIGS. 5 and 6). The focusing lever 30 is keyed to a short vertical shaft 36 shown in FIGS. 2, 3 and 6, which shaft carries a rocker arm 38 inside the camera in the region of the two guide pins 34. The rocker arm 38 is connected by a pivot 40 to a link 42 which in turn is connected by a pivot 44 to one of the two guide pins 34.

Forward movement of the focusing lever 30 retracts the cylindrical housing section 14 for focusing on distant objects and rearward movement of the focusing lever shifts the cylindrical section forward for focusing on close subjects. A scale member 45 mounted on the top side of the camera housing has the usual scale calibrated in distance values for guidance in adjustment of the focusing lever 30. In the construction shown the scale member 45 is provided with an upright longitudinal flange 46 and this flange is provided with a series of notches 48 corresponding to the scale values. The focusing lever 30 carries a detent element in the form of a downwardly extending flange 50 for engagement with the notches 48 selectively, the focusing lever being resiliently flexible to permit the detent element to be shifted from notch to notch.

In the present embodiment of the invention the view finder is operatively connected to the focusing lever 30 for parallax adjustment in synchronism with focusing adjustment. For this purpose the underside of the base block 16 of the view finder is recessed as shown in FIGS. 1 and 4 to straddle the pivoted end of the focusing lever 30 and the base block is hingedly mounted at its forward end on a pair of ears 52. A suitable torque spring 54 (FIG. 6) urges the hinged base block 16 downward towards the underlying focusing lever 30. A setscrew 55 carried by the base block 16 extends downward into contact with a cam element 56 of the focusing lever 30 under the pressure provided by the torque spring 54. The cam element 56 is an upstanding flange of the focusing lever, the flange being concentric to the pivot axis of the lever, the upper edge of the flange being inclined to cause tilting movement of the view finder base block 16. Once the setscrew 55 is adjusted for calibration it is suitably locked or potted to make the adjustment permanent. When the focusing lever 30 is shifted rearwardly for focusing the camera on a close subject, the cam element 56 acting on the setscrew 55 tilts the view finder forward and vice versa.

The function of the shutter control lever 32 is to move an actuating member in the form of an arcuate bracket 58 in a path concentric to the lens mount to actuate the cocking lever 24 and the tripping lever 25. For this purpose the actuating bracket 58 has a flange 60 at its upper end to abut and actuate the cocking lever and has a second flange 62 at its lower end to abut and actuate the tripping lever. Normally the actuating bracket 58 is in a normal position between the cocking lever 24 and the tripping lever 25 as shown in FIG. 7 out of actuating contact with both of the shutter levers. Lifting the shutter control lever 32 as shown in FIG. 8 shifts the actuating bracket 58 in a clockwise direction to actuate the cocking lever 24 as shown in FIG. 8. Depressing the shutter control lever 32 from its normal position as shown in FIG. 9 shifts the arcuate bracket 58 counterclockwise to cause the flange 62 to actuate the tripping lever 25.

Any suitable mechanism may be provided for operatively connecting the shutter control lever 32 to the actuating bracket 58 and any suitable spring arrangement may be provided to urge the shutter control lever towards its normal position. The structure employed in the present embodiment of the invention is shown in FIGS. 5-9.

As shown in FIGS. 5 and 6, the extensible cylindrical housing section 14 of the camera comprises a ring 64 that is fixedly mounted on the outer ends of the two guide pins 34 and a cup-shaped operating shell 65. The forward radial wall 66 of the operating shell 65 has a central circular aperture whereby the operating shell is journaled for rotation on an inner flange 68 of the ring 64. As shown in FIG. 6, an inner cylindrical skirt 70 of the ring 64 telescopes inside the fixed cylindrical wall 35 and the rotary operating shell 65 telescopes over the outside of the fixed cylindrical wall to keep light out of the interior of the camera.

The lens mount 15 abuts both the radial wall 66 of the operating shell 65 and the inner flange 68 of the ring 64. The lens mount has a cylindrical portion 72 that extends through the ring for engagement by a retaining bushing 74. The retaining bushing 74 is tightened against the inner face of the ring 64 to consolidate the assembly.

As best shown in FIG. 5, the forward face of the ring 64 is provided with two forwardly extending pins 76 and 78. The pin 76 anchors one end of a compression spring 80 and the pin 78 anchors one end of a tension spring 82. The two springs 80 and 82 are confined respectively in concentric arcuate slots 84 and 85 in the forward radial wall 66 of the rotary operating shell 65. The shutter control lever 32 is fixedly mounted on the operating shell 65 for control thereof.

The second end of the compression spring 80 is free but is normally in compressive abutment against the lower end 94 of the arcuate slot 84. The second upper end of the tension spring 82 is anchored directly to the operating shell 65 by a suitable attachment means 95. The tension spring 82 is normally under slight tension so that the two springs normally exert opposing forces, the compression spring acting against the end of the slot 84 to urge the operating shell 65 clockwise and the tension spring 82 urging the operating shell counterclockwise, the two springs being balanced or in equilibrium at the normal rotary position of the operating shell shown in FIGS. 7 and 7a.

The two slots 84 and 85 that confine the two springs 80 and 82 are covered by an annular plate 96 which may serve as a nameplate. The previously mentioned arcuate actuating bracket 58 is mounted on the front face of the annular plate 96 by means of a pair of screws 98. The two screws 98 extend through the annular plate 96 into threaded engagement with the operating shell 65 to make the actuating bracket 58 unitary with the operating shell.

The manner in which the invention functions for its purpose may be readily understood from the foregoing description. With the focusing lever 30 and the shutter control lever 32 at the fingertips of the hand that grips the right side of the camera it is a simple matter to manipulate both of the two levers while the photographer is maneuvering the camera to sight on the subject. Only slight upward flexure of the focusing lever 30 is necessary to free the focusing lever momentarily from the notches of the scale member 45. As the focusing lever 30 is swung forward or rearward to focus on a subject, the view finder tilts automatically to compensate for parallax.

When the shutter control lever 32 is swung upward from the normal position shown in FIG. 7 to the elevated position in FIG. 8 the two arcuate slots 84 and 85 of the operating shell 65 shift correspondingly as may be seen by comparing FIG. 8a with FIG. 7a. The clockwise shift of the slot 84 releases the compression spring 80 completely from compressive stress and the lower end 94 of the slot 84 retracts downward from the spring. On the other hand the clockwise shift of the second slot 85 in moving the attachment means 95 away from the pin 78 stretches the tension spring 82 to store energy in the tension spring.

When the photographer relaxes his upward pressure on the shutter control lever 32 the force stored in the tension spring 82 returns the operating shell 65 counterclockwise to restore the operating shell and the shutter control lever 32 to their normal positions shown in FIG. 7. As the operating shell approaches its normal position in its counterclockwise return rotation, the lower end 94 of the slot 84 contacts the free end of the compression spring 80 to permit the compression spring to serve as a shock absorber for decelerating the return movement. The two springs 80 and 82 then oppose each other in equilibrium to hold the operating shell and shutter control lever in their normal positions in a yielding manner.

The upward movement of the shutter control lever 32 moves the flange 60 of the actuating bracket 58 against the cocking lever 24 for clockwise actuation of the cocking lever. The compression spring 80 not only decelerates the return rotation of the operating shell 65 but also keeps the operating shell from returning so far as to cause the arcuate bracket 58 to operate the tripping lever 25. This operation for cocking the shutter mechanism may be carried out, of course, in advance or while the photographer is raising his camera to a sighting position.

To take the picture, the operator merely depresses the outer end of the shutter control lever 32 slightly to bring the lower flange 62 of the actuating bracket against the tripping lever 25 in the manner shown in FIG. 9. The consequent counterclockwise rotation of the operating shell 65 correspondingly compresses the compression spring 80 and correspondingly relaxes the tension spring 82. When the operator releases the shutter control lever 32 the compression spring 80 expands to rotate the operating shell 65 back to its normal position.

Since the operating shell 65 shifts axially for focusing adjustment, the shutter control lever 32 that is mounted thereon also shifts forward and rearward. If it is desired to keep the shutter control lever in fixed plane of rotation, the camera construction may be modified in the manner indicated in FIGS. 10 and 11.

In FIG. 10 the shutter control lever is not mounted on the operating shell 65a but is mounted on a separate sleeve 100 that rotatably embraces the fixed cylindrical wall 35 of the camera housing and is secured thereon by a snap ring 102. The operating shell 65a overhangs the rotary sleeve 100 and is slidingly keyed thereto. In the construction shown, a radial setscrew 104 in the operating shell 65a slides in a longitudinal slot 105 of the rotary sleeve 100. By virtue of this arrangement, the shutter control lever 32 rotates in a fixed plane to control the rotary position of the operating shell 65a.

My description in specific detail of the selected embodiments of the invention will suggest various changes, substitutions and other departures from my disclosure within the spirit and scope of the appended claims.

I claim:

1. In a camera having a housing with a lens mount carried by an extensible section of the housing and incorporating a shutter mechanism, the combination therewith of: a focusing lever mounted on the housing for forward and rearward swinging movement with the swinging end of the lever extending to one side of the housing for manipulation by the fingers of a hand supporting said one side of the housing, said focusing lever being operatively connected to said extensible section of the housing to control the position of the lens mount; a shutter operating lever mounted on said extensible section of the housing with the swinging end of the lever extending to one side of the housing for manipulation by the fingers of a hand supporting the same side of the housing; spring means yieldingly holding said shutter operating lever in a normal position, said shutter operating lever being swingable in opposite directions from its normal position against the resistance of said spring means; means to cock the shutter mechanism in response to movement of the lever in one direction from its normal position; and means to trip the cocked shutter mechanism in response to movement of the lever in the other direction from its normal position.

2. A combination as set forth in claim 1 which includes a view finder adjustably mounted on said housing and operatively connected with said focusing lever for parallax adjustment thereby.

3. A combination as set forth in claim 1 in which said spring means includes a compression spring normally urging said shutter operating lever in said one direction to oppose the tripping of the shutter mechanism and to absorb the shock of the return of the lever from the shutter cocking movement and a tension spring urging the shutter operating lever in said other direction to oppose the cocking of the shutter mechanism, said two springs being stressed in equilibrium at the normal position of the shutter operating lever.

4. In a camera having a housing with a lens mount incorporating a shutter mechanism with a cocking lever movable in one direction circumferentially of the lens mount to cock the mechanism and a trip lever movable in the opposite direction circumferentially of the lens mount to trip the mechanism, the combination therewith of: actuating means positioned between said two levers and movable in opposite directions circumferentially of the lens mount from a normal position to actuate the two levers respectively; yielding means normally holding said actuating means in its normal position; and a handle operatively connected with said actuating means for actuation thereof, said handle extending to one side of the camera.

5. A combination as set forth in claim 4 in which said actuating means is a rotary means and said yielding means comprises a pair of opposed springs.

6. A combination as set forth in claim 4 in which said actuating means includes a plate rotatable in its own plane with two concentric arcuate slots therein, said two springs being coil springs positioned in said two slots respectively.

7. A combination as set forth in claim 6 in which one of said springs is a tension spring interconnecting the actuating means and the camera housing, the other spring being a compression spring having one end connected to the camera housing and having its other end in abutment against one end of the corresponding slot.

8. In a camera having a housing with forward cylindrical portion and having means supporting a lens mount, said supporting means being mounted on said forward cylindrical portion for longitudinal focusing reciprocation relative thereto and wherein the lens mount incorporates a shutter mechanism with a cocking lever movable in one direction circumferentially of the lens mount to cock the mechanism and a trip lever movable in the opposite circumferential direction to trip the mechanism, the combination therewith of: a sleeve rotatably mounted on said cylindrical portion; actuating means rotatably mounted on said supporting means and extending between said two levers for rotation in opposite directions from a normal position to actuate the two levers respectively; yielding means acting between said supporting means and said actuating means and normally holding the actuating means at its normal position, said actuating means being slidingly keyed to said sleeve for actuation thereby; and a manual control member mounted on said sleeve for manual rotation thereof.

References Cited in the file of this patent

UNITED STATES PATENTS

| | | |
|---|---|---|
| 2,439,087 | Harvey | Apr. 6, 1948 |
| 2,520,505 | Keresztes | Aug. 29, 1950 |
| 2,552,244 | White | May 8, 1951 |
| 2,697,390 | Kindelberger | Dec. 21, 1954 |
| 2,736,251 | Sachsinger | Feb. 28, 1956 |
| 2,812,698 | Tiranti | Nov. 12, 1957 |
| 2,854,907 | Tieck | Oct. 7, 1958 |
| 2,860,560 | Traino | Nov. 18, 1958 |
| 2,896,524 | Warzybok | July 28, 1959 |